Feb. 1, 1966　　　　J. L. MOSSEY　　　　3,232,392
BRAKE ADJUSTER
Filed May 31, 1963　　　　　　　　　4 Sheets-Sheet 1
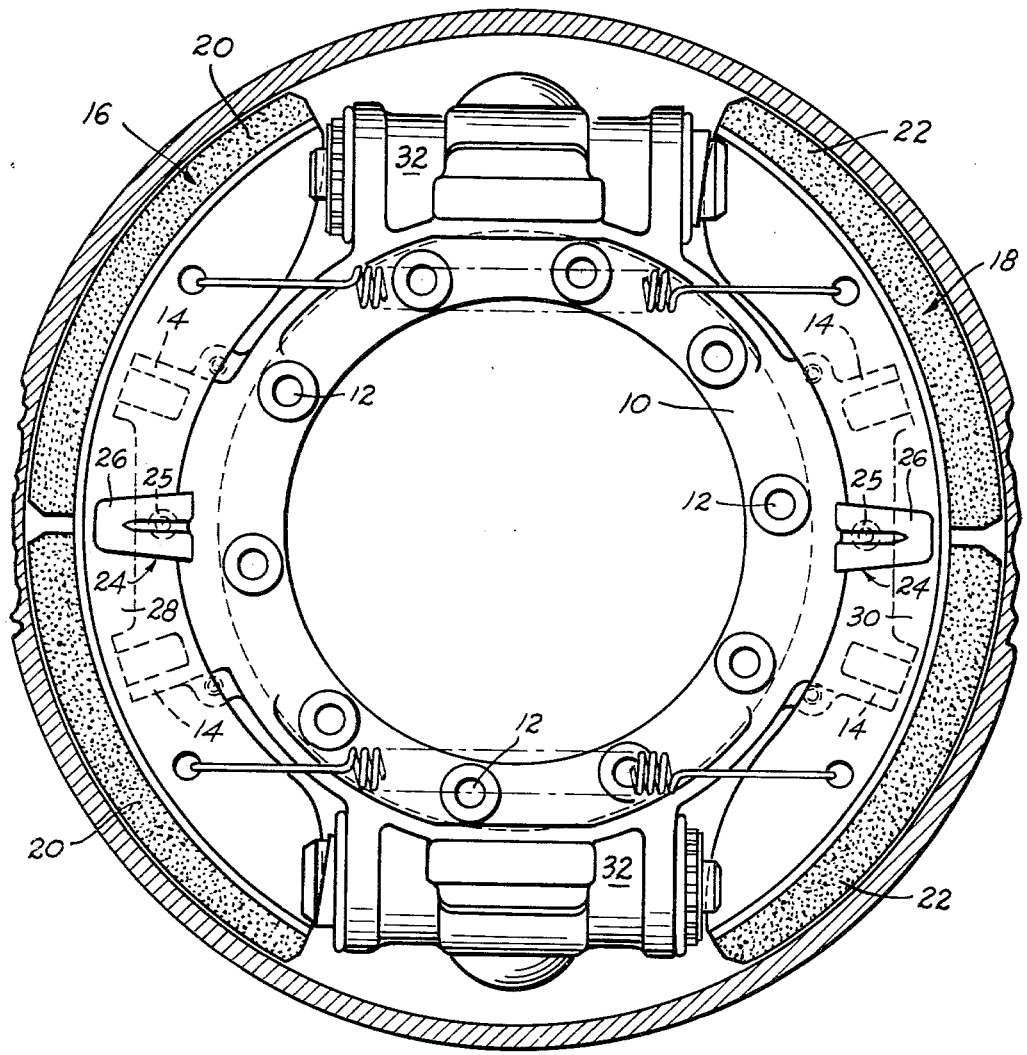
FIG_1
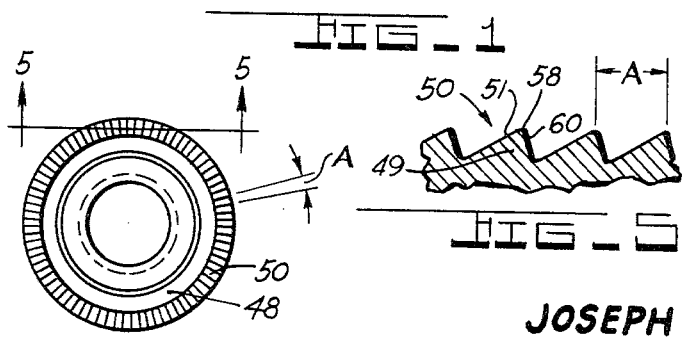
FIG_4　　FIG_5
INVENTOR.
JOSEPH L. MOSSEY.
BY
Sheldon F. Raizer
ATTORNEY.

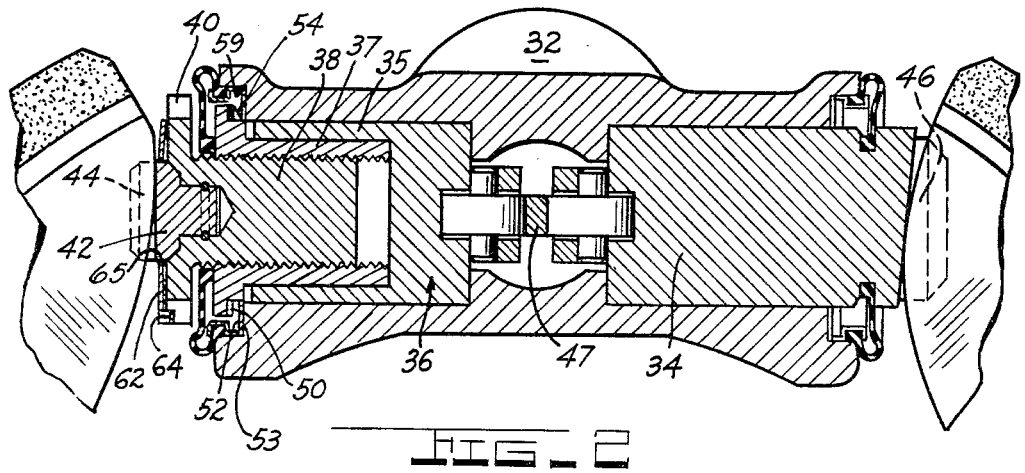
FIG_2
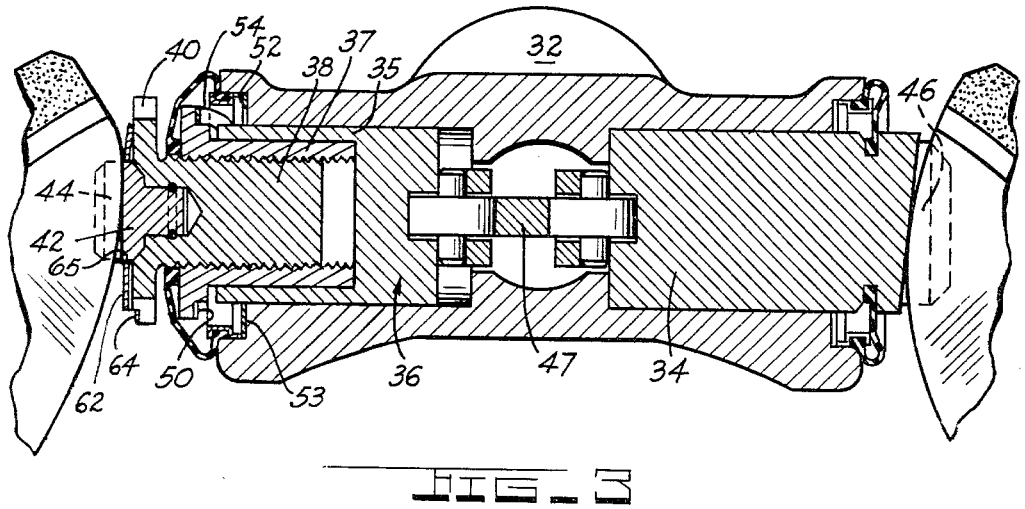
FIG_3
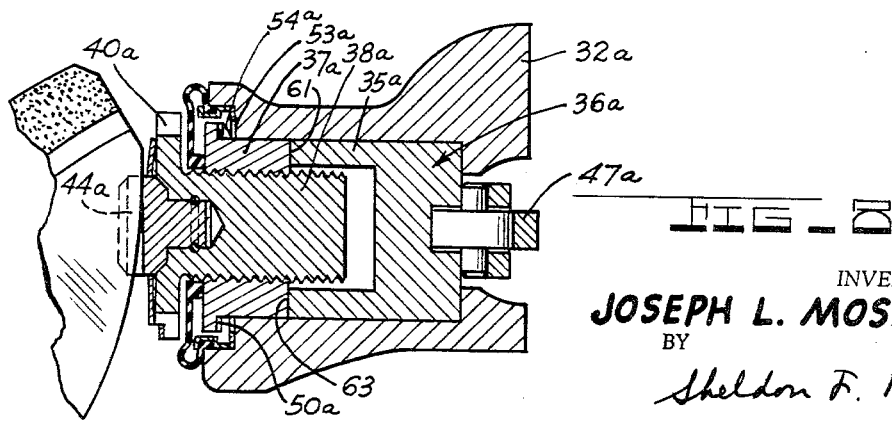
FIG_5
INVENTOR.
JOSEPH L. MOSSEY.
BY
Sheldon F. Raizes
ATTORNEY.

Feb. 1, 1966  J. L. MOSSEY  3,232,392
BRAKE ADJUSTER
Filed May 31, 1963  4 Sheets-Sheet 3
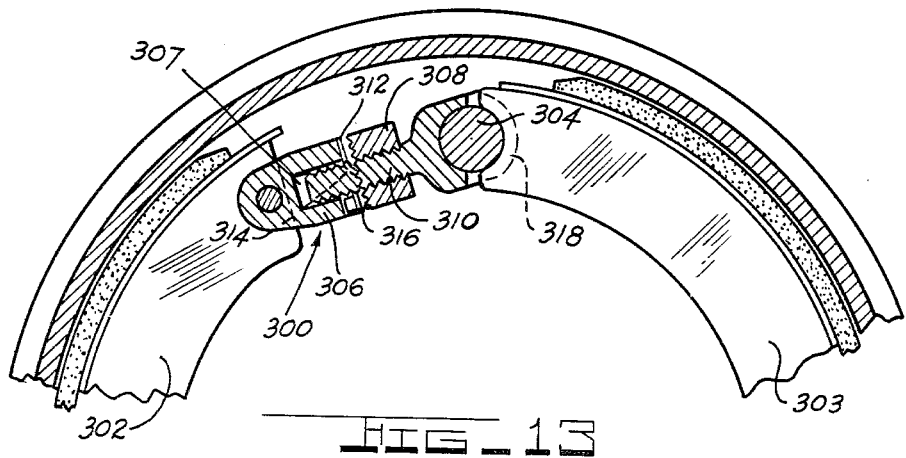
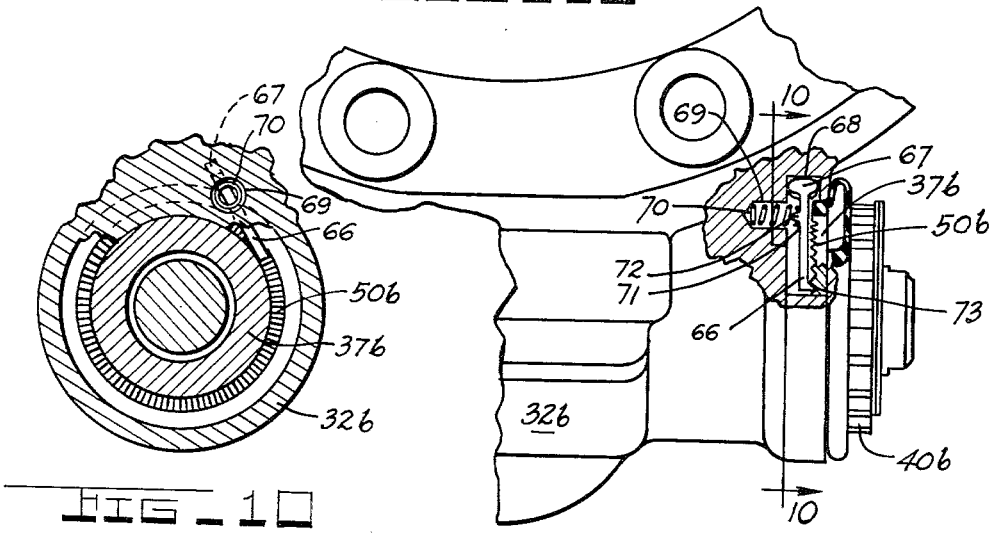
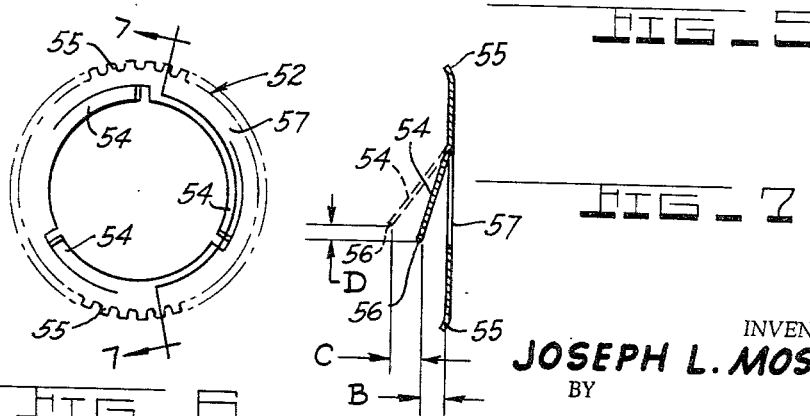
INVENTOR.
JOSEPH L. MOSSEY.
BY
Sheldon F. Raizes
ATTORNEY.

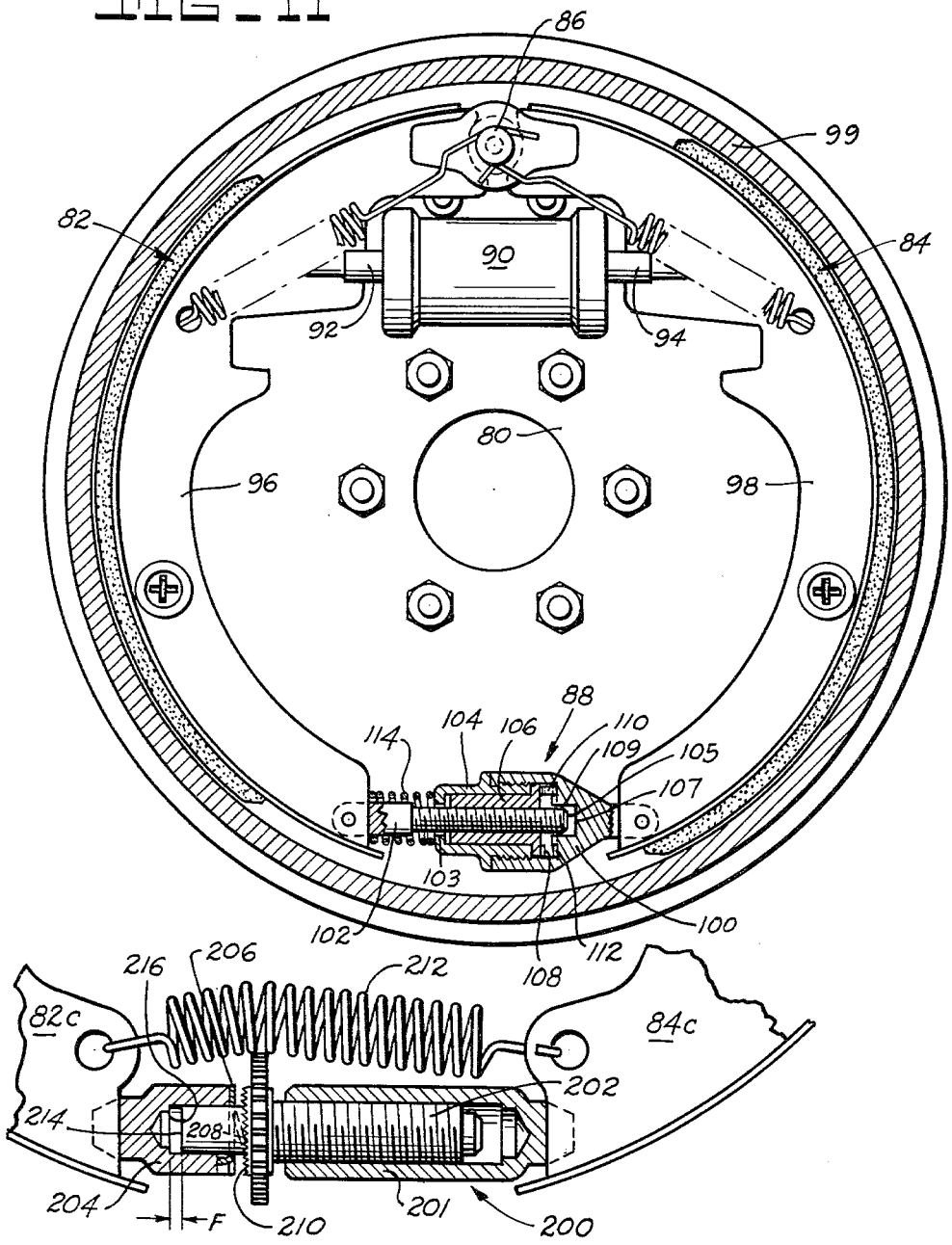

United States Patent Office 3,232,392
Patented Feb. 1, 1966

3,232,392
BRAKE ADJUSTER
Joseph L. Mossey, South Bend, Ind., assignor to The Bendix Corporation, South Bend, Ind., a corporation of Delaware
Filed May 31, 1963, Ser. No. 284,439
3 Claims. (Cl. 188—196)

This invention relates to an automatic adjuster for brakes.

An object of this invention is to provide an automatic adjuster for a brake wherein two relatively movable members, one of which has teeth thereon, have resiliently biased pawl means interposed therebetween and engaging said teeth wherein said pawl means will pick up a different tooth upon relative movement of said members a certain distance away from each other and thereafter upon relative movement of the members toward each other, the pawl means will rotate one of the members relative to the other member for effecting adjustment of the brake.

Another object of the invention is to provide an automatic adjuster utilizing the concept as stated above wherein the adjuster varies the length of a piston or plunger which bears on a brake shoe.

A further object of the invention is to provide an automatic adjuster of the above stated concept wherein the automatic adjuster is utilized for extending the length of an adjustable strut which interconnects two brake shoes.

Other objects of the invention will become apparent from the following description with reference to the drawings wherein:

FIGURE 1 is a front elevational view of a brake assembly;

FIGURE 2 is a front section view of the actuator and adjusting mechanism of the brake assembly of FIG. 1, which are illustrated in shoe retracted position;

FIGURE 3 is the same view as FIG. 2 with the actuator elements being illustrated in shoe application position;

FIGURE 4 is a side view of the adjuster screw nut of the brake assembly;

FIGURE 5 is a view taken along section line 5—5 of FIG. 4;

FIGURE 6 is a view of an adjuster ring of the adjusting mechanism illustrated in the embodiment of FIG. 1;

FIGURE 7 is an exaggerated view taken on section line 7—7 of FIG. 6;

FIGURE 8 is a partial view in section of a modified brake adjusting mechanism and actuator;

FIGURE 9 is a partial front elevational view of another modified brake adjusting mechanism and actuator with the housing being partially cut away to illustrate the adjusting mechanism;

FIGURE 10 is a view taken on section line 10—10 of FIGURE 9;

FIGURE 11 is a front elevational view of another brake assembly illustrating another automatic adjuster;

FIGURE 12 is a partial view of a modified adjuster for the brake assembly of FIG. 11; and FIGURE 13 is a partial front elevational view of another brake assembly depicting still another adjuster.

Referring to FIGURE 1, the brake assembly illustrated therein has a torque spider or support plate 10 which is adapted to be mounted on a stationary part of a vehicle, such as an axle flange, by inserting bolts (not shown) through circumferentially spaced holes 12. The torque spider has supporting ledges 14 for slidably supporting a pair of T-shaped brake shoes 16 and 18 having friction linings 20 and 22, respectively. A pair of hold-down springs 24 are each mounted to the torque spider by bolts 25 and each has a portion 26 engaging the webs 28 and 30 of brake shoes 16 and 18, respectively, for biasing the shoes against the supporting ledges 14. The torque spider also has a pair of diametrically opposed cylinder housings 32 formed integrally therewith, each of which contains a pair of movable pitsons 34 and 36.

Referring to FIGURES 2–7, the piston 36 comprises a hollow sleeve 35, an adjusting screw nut 37 and an adjusting screw member 38. The adjusting screw nut 37 has a hollow interior, the sidewalls of which are threaded for rotatably receiving the adjusting screw member 38 which is T-shaped in cross section. An outer peripheral toothed portion 40 is located on the flange of the adjusting screw member 38 and is adapted to be manually engaged for turning the adjusting screw member 38 and extending the effective length of the piston 36 for compensation of wear of the brake shoes 16 and 18. An abutment member 42 is secured to the adjusting screw member 38 for relative rotation therewith and has a slot 44 therein which slidingly receives one end of its respective brake shoe and the piston 34 has a slot 46 at its outer end for slidably receiving one end of its respective brake shoe. The screw nut 37 has an annular flange containing a plurality of teeth 50 which are spaced a circumferential distance A from each other. An annular adjuster ring 52 has a plurality of teeth 55 located at the peripheral edge of the adjuster ring 52 which are bent slightly from the plane of the base 57. The diameter of the ring including the teeth 55 is slightly greater than the diameter of the annular shoulder 53 so the ring may be fitted into the wall 59 surrounding annular shoulder 53. As the ring 52 is pressed into place, the teeth will be deformed a greater angle away from the plane of the base 57 with the result being that the teeth 55 tend to return to their normal position and thus dig into the wall 59 to lock the ring 52 in position. The resilient fingers or pawl members 54 are integral with the ring 52 with the ends 56 of the resilient fingers 54 being spaced a distance B from the plane of the base portion 57 of the ring 52 when the piston 36 is in retracted position.

A spring clip 62 having a depending flange 64 disposed within one of the plurality of notches 40 of the screw 38 has a central opening 65 with a plurality of flats which mate with flats on the abutment member 42 to prevent relative rotation between the abutment member 42 and the clip 62. Since the web 28 of shoe 16 is disposed within a groove 44 of the abutment 42, rotation of the abutment is prevented by the shoe and, therefore, rotation of the screw 38 is normally prevented since the clip 62 is unable to rotate. However, upon applying a tool to the notched periphery 40 of the screw 38, the screw 40 may be turned with the flange 64 slipping out of the notches during manual turning of the screw 40 to effect manual adjustment.

Each of the pistons 36 and 34 is reciprocally moved within their respective cylinder housings 32 by a wedge member 47. The wedge construction may be of any well known arrangement such as illustrated in U.S. Patent No. 2,527,126 to Goepfrich.

Upon application of the brake shoes the sleeve 36, adjusting screw nut 37 and adjusting screw 38 are thrust outwardly as a unit with the spring fingers or pawls 54 following the lineal movement of the ring of teeth 50 of the adjusting screw nut 37. The spring finger 54 will have moved a lineal or axial distance C and at the same time a corresponding distance D corresponding to a circumferential distance on the ring of teeth 50. If the circumferential distance D is greater than the spacing A of the teeth 50 on the adjusting screw nut 37, then the spring finger 54 will slide up the incline surface 51 of a tooth 49 and beyond the edge 58 of the tooth 49, and upon return of the adjusting screw nut 37 picks up the tooth 49 with the end 56 of the lever 54 engaging the face 60 of the tooth 49 to form a driving connection therewith. Upon retraction of the brake shoes, the adjusting screw nut 37 will compress the spring finger 54 back to its normally retracted position, the spring finger edge 56 having traversed a circumferential distance D to obtain the retracted position. As this edge traverses the distance D toward the retracted position, a rotative force is imparted on the adjusting screw nut 37 by the driving connection between the tooth 49 and the spring finger 54 thereby moving the adjusting screw member 38 axially outwardly a given amount effecting automatic adjustment of the brake. Obviously, the same operation will be repeated when the lining has worn a certain given increment defined by the spacing of the teeth on ring 50.

Referring to FIGURE 8, a modified version of the piston 36 assembly is illustrated. The same reference numerals are used to denote the same elements as the piston 36 assembly only having the letter a affixed thereto. The sole difference between the two piston assemblies is instead of the adjusting screw nut 37a telescoping within the sleeve 35a, a thrust connection is formed between the end surfaces 61 and 63 of the adjusting screw nut 37a and the sleeve 35a, respectively.

Referring to FIGURES 9 and 10, a modified embodiment of FIG. 1 is disclosed wherein a pivoted lever 66 is substituted for the ring and pawl 52. Elements similar to the embodiment of FIG. 1 are designated with like reference numerals with the letter b affixed thereto. The lever 66 has a round end 67 bearing against the end and side walls and an opening 68 in the housing 32b. A hole 69 is provided within the housing for receiving an end of a coil spring 70 which bears against the bottom of the hole and against the shoulder 71 of the lever 66. A projection 72 extending from the lever 66 maintains the spring 70 in the proper location. The lever 66 has a sharp edge 73 for engaging with the teeth 50b of the adjusting screw nut 37b. The operation of the lever 66 will be exactly the same as that of the spring pawl finger 54.

The above concept, namely translating lineal motion into rotary motion for automatic adjustment of a brake, can be utilized in a brake of the type as illustrated in FIG. 11. The brake assembly comprises a backing plate 80 and a pair of brake shoes 82 and 84 slidably mounted thereon. An anchor pin 86 is mounted to the backing plate and is disposed between one pair of brake shoe ends and an adjustable strut 88 is disposed between the other pair of brake shoe ends. A wheel cylinder 90 is mounted on the backing plate and has a pair of thrust links 92 and 94 engaging webs 96 and 98 of the brake shoes for thrusting the brake shoes outwardly into engagement with a brake drum 99. The adjustable strut 88 comprises a socket 100 and an adjusting screw 102 which are mounted to a respective end of the webs 96 and 98 of the brake shoes 82 and 84. A hollow sleeve 104 is threadedly attached to the socket 100 and an adjusting screw nut 106 is threadedly mounted on the adjusting screw 102 for relative rotation therewith and is also mounted for relative rotation with the sleeve 104. The free end of the threaded stem of the adjusting screw 102 is slidable within an oversized opening 103 of the sleeve 104 and has an end 105 adapted to engage the end surface 107 of an oversized opening 109 of the pivot nut 100 during brake application. The adjusting screw nut 106 has an annular knurled surface 108 for engagement by a finger 110 of an annular adjusting ring 112, which is rigidly attached to the socket 100. The ring 112 is constructed substantially the same as ring 52 illustrated in FIG. 6. A coil spring 114 maintains the brake shoe ends a certain distance apart, maintains the spring finger 110 at a certain distance above the main base portion of the ring 112 to permit the finger 110 to swing out of the path of one tooth into the path of a successive tooth of the knurled surface 108, and maintains the adjusting screw end 105 and shoulder 107 spaced a given distance. In operation, when the brake is applied, the end 105 and shoulder 107 are forced together thereby compressing the resilient finger 110 and producing rotative motion upon the adjusting screw nut 106 effecting adjustment of the strut 88. Upon release of braking pressure, spring 114 spreads the ends of the shoes whereby the finger 110 picks up a new tooth. It should be noted that adjustment will occur upon each application of the brake, but since the knurled surface 108 permits a very fine adjustment upon each application, overadjustment will not occur.

Referring to FIGURE 12, there is illustrated a modified adjustable strut 200 for use with the type of brake shoe arrangement as illustrated in FIG. 11. The adjustable strut 200 comprises a fixed adjusting screw nut 201, an adjusting screw 202 and a fixed socket 204. The adjusting screw 202 has a threaded end rotatably attached to the adjusting nut 201 and a smooth end which is pivotably and axially slidable relative to the socket 204. A ring 206 is secured to the socket 204 and has a resilient finger 208 extending therefrom and in engagement with an annular knurled surface 210 attached to the adjusting screw 202. A coil spring 212 maintains the ends of the brake shoes 82c and 84c in engagement with the adjusting screw nut 201 and adjusting socket 204, respectively. The resilient force of the finger 208 is greater than that of the coil spring 212 and is such that the finger will bias the end 214 of the adjusting screw a distance F away from a shoulder 216 of the socket 204, the resilient force of the spring finger 208 being spent at that distance. In operation, when the brake is applied, the shoulder 216 of the pivot nut 204 and the end 214 of the adjusting screw nut 201 are forced together thereby compressing the resilient finger 208 and producing rotative motion upon the adjusting screw 202, effecting longitudinal adjustment of the strut 200. Upon release of the brake, the finger 208 pushes the screw nut end 214 away from shoulder 216 a distance F, and at the same time slides over one tooth onto a successive tooth.

In the embodiment shown in FIGURE 13, the brake assembly is the same as that illustrated in FIGURE 11, except a non-adjustable strut is interposed between the ends of the brake shoes opposite the anchor and an adjusting mechanism 300 is interposed between one end of the leading brake shoe 302 and the anchor pin 304. The adjusting mechanism 300 comprises a non-rotatable socket 306, a rotatable adjusting screw nut 308 and an adjusting screw 310. The free end of the adjusting screw 310 is slidable in an oversized opening 307 of the socket 306. A ring 312 is rigidly attached to the adjusting socket 306 and has a resilient finger 314 extending therefrom and engaging a knurled surface 316 on the adjusting screw nut 308. The adjusting screw 310 is integral with a ring 318 which pivots on the anchor pin 304.

Upon brake application, the brake shoe 302 and the socket 306 move away from the adjusting screw nut 308 allowing the resilient finger 314 to extend a certain distance along the axis of the adjusting mechanism corresponding to a given circumferential distance with respect to the ring of teeth 316. If this axial distance allows a movement of the finger 314 in the circumferential direction greater than the distance that the teeth of the ring 316 are spaced apart, the finger will pick up another tooth. Upon retracting force by a return spring (not shown), the non-rotatable socket 306 will move toward the adjusting screw nut 308 compressing the spring finger 314 and imparting a rotative motion on the adjusting screw nut 308 thereby relocating the whole shoe ring, which comprises the two brake shoes and the non-adjustable strut, to compensate for the lining wear. Obviously, the location of the serrated surfaces and the fingers or pawls of the adjuster embodiments of FIGS. 1, 8, 11, 12 and 13 may be reversed so that the serrated surface is attached to a non-rotatable element of the adjusters and the finger or pawl is attached to a rotatable element of the adjusters; the function of the adjusters being the same as those of the above mentioned embodiments.

Although a few embodiments of the invention have been described in considerable detail, numerous modifications of the invention will occur to those skilled in the art. I, therefore, intend to include within the scope of the following claims all equivalent devices which are similar in structure and function in substantially the same manner as that described.

I claim:

1. In a brake or the like: actuating means, a housing having a bore therein, said actuating means including a hollow cylindrical sleeve slidable in said bore, an internally threaded adjusting screw nut rotatably mounted in said sleeve, a non-rotatable adjusting screw member threadedly connected to said adjusting screw nut, said adjusting screw nut further having a flange having an annular surface facing an end surface portion of said housing surrounding said bore and being longitudinally spaced therefrom, one of said surfaces being serrated and the other surface having pivotally mounted pawl means extending therefrom toward said serrated surface and adapted for engagement therewith, said pawl means comprising an annular member connected to said other surface, said annular member comprising at least one resilient finger integral therewith biased away from its respective surface and adapted to engage said serrated surface to form a driving relationship therebetween, whereby upon longitudinal movement of said adjusting screw nut away from said housing end surface beyond a predetermined amount, said finger will engage a different portion of said serrated surface and upon return of said adjusting screw nut to retracted position, said finger will be moved against its biasing force toward its respective surface to create rotation of said adjusting screw nut through said driving relationship thereby effecting relative longitudinal movement between said adjusting screw member and said adjusting screw nut.

2. The structure as recited in claim 1 wherein said housing bore includes an annular shoulder receiving said annular member, said annular member having means on the outer periphery thereof frictionally engaging the wall surrounding said shoulder to hold said annular member in position.

3. The structure as recited in claim 1 wherein said pawl means is located on said housing and said serrated surface is located on said adjusting screw nut.

References Cited by the Examiner

UNITED STATES PATENTS

| 1,971,643 | 8/1934 | De Lavaud | 188—79.5 |
| 2,389,618 | 11 1945 | Goefrich | 188–79.5 |
| 2,733,781 | 2/1956 | Brisson | 188-196 |

MILTON BUCHLER, *Primary Examiner.*

DUANE A. REGER, *Examiner.*